(12) United States Patent
Shioda

(10) Patent No.: US 8,090,247 B2
(45) Date of Patent: Jan. 3, 2012

(54) VIBRATION REDUCTION UNIT, LENS BARREL AND CAMERA

(75) Inventor: Takanori Shioda, Chofu (JP)

(73) Assignee: Nikon Corporation, Tokyo (JP)

( * ) Notice: Subject to any disclaimer, the term of this patent is extended or adjusted under 35 U.S.C. 154(b) by 119 days.

(21) Appl. No.: 12/073,367

(22) Filed: Mar. 4, 2008

(65) Prior Publication Data
US 2008/0219653 A1    Sep. 11, 2008

(30) Foreign Application Priority Data
Mar. 7, 2007    (JP) .................................. 2007-057156

(51) Int. Cl.
*G03B 17/00* (2006.01)
(52) U.S. Cl. ...................... 396/55; 348/208.11; 359/557
(58) Field of Classification Search .................... 396/55; 348/208.11; 359/557
See application file for complete search history.

(56) References Cited

U.S. PATENT DOCUMENTS

| | | | | |
|---|---|---|---|---|
| 5,489,959 | A * | 2/1996 | Akada | 396/508 |
| 5,835,799 | A * | 11/1998 | Washisu | 396/55 |
| 2006/0152093 | A1 * | 7/2006 | Oishi et al. | 310/36 |
| 2006/0165397 | A1 | 7/2006 | Uehara et al. | |
| 2006/0269263 | A1 | 11/2006 | Kim et al. | |
| 2006/0285839 | A1 * | 12/2006 | Tomita | 396/55 |
| 2006/0285840 | A1 | 12/2006 | Takahashi | |

FOREIGN PATENT DOCUMENTS

| | | |
|---|---|---|
| EP | 1 729 509 | 12/2006 |
| EP | 1 732 312 | 12/2006 |
| JP | 10-26779 | 1/1998 |
| JP | 2006-295553 | 10/2006 |

OTHER PUBLICATIONS

Translation of JP Publication No. 2006-337957; Lens Barrel; Yamashita, Kengo; Publication Date: Dec. 14, 2006.*
Extended European Search Report issued Sep. 4, 2008 in corresponding European Patent Application No. 08102243.6.

* cited by examiner

*Primary Examiner* — Rodney Fuller
*Assistant Examiner* — Fang-Chi Chang

(57) ABSTRACT

To provide a compact vibration reduction unit, a lens barrel, and a camera, which can perform positional detection with a high degree of accuracy during operations for vibration reduction. A vibration reduction unit of the present invention is comprising: a shooting optical system; a movable optical member that is part of the shooting optical system or which is another member, and which is provided movably relative to the shooting optical system; a magnetic sensor used to detect a position of the movable optical member; and a coil having a winding center line of a winding wire situated substantially in parallel with and on substantially the same plane as a given plane in which the magnetic sensor is disposed.

9 Claims, 9 Drawing Sheets

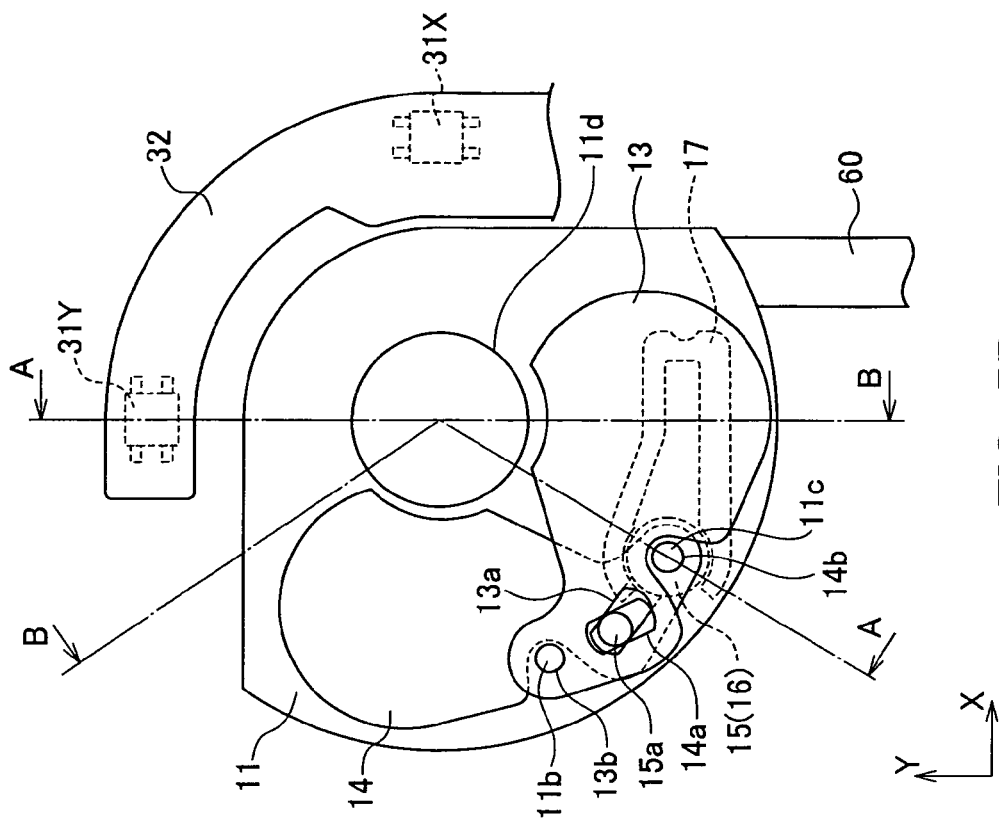
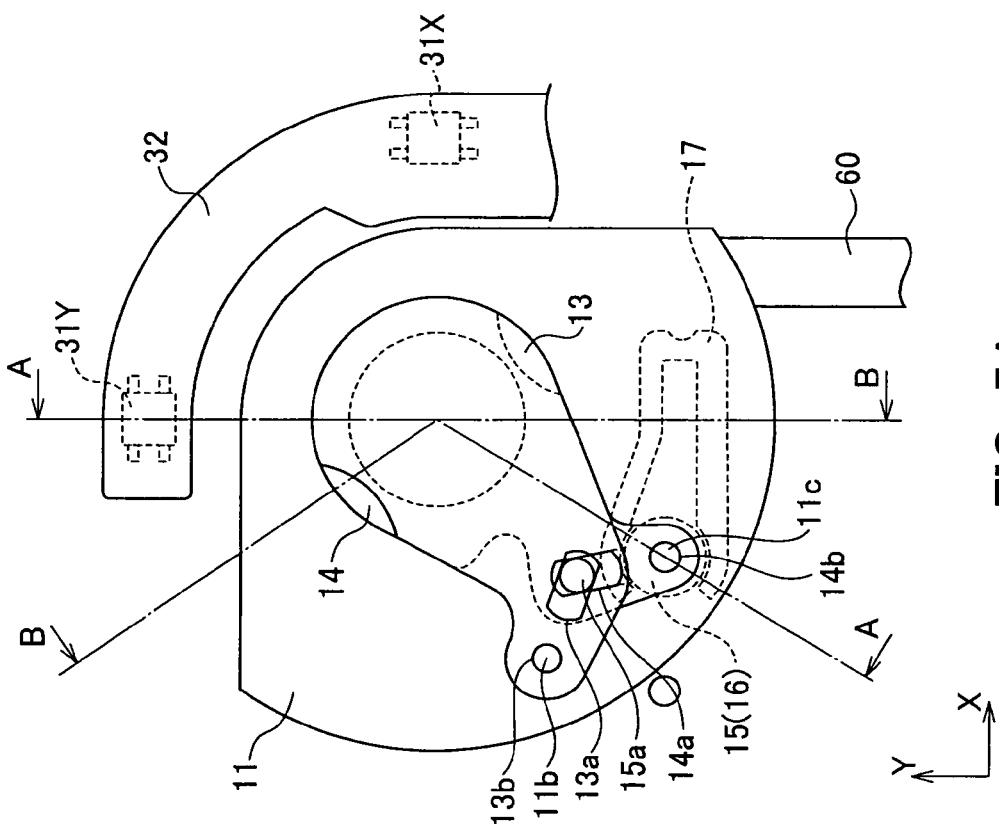

VIBRATION REDUCTION UNIT, LENS BARREL AND CAMERA

The disclosure of the following priority application is herein incorporated by reference: Japanese Patent Application No. 2007-057156 filed on Mar. 7, 2007.

BACKGROUND OF THE INVENTION

1. Field of the Invention

The present invention relates to a vibration reduction unit, a lens barrel and a camera, which are provided with a magnetic sensor.

2. Description of the Related Art

A camera having a vibration reduction mechanism for moving a lens unit in a direction perpendicular to its optical axis to mitigate image blur due to blurring caused by the hand of the photographer has been known.

A technique in which a magnetic sensor is used to detect the positions of the lens unit in such a camera (for example, see Japanese Unexamined Patent Application Publication No. Hei 10-26779) has also been disclosed.

In the case where such a camera is constructed as e.g., a lens-integrated type compact camera, an optical system for vibration reduction may be located in the vicinity of a shutter unit or an aperture unit.

Such a case has led to the problem in that the accuracy of the positional detection of the optical system for vibration reduction based on the magnetic sensor is decreased if the magnetic fields caused by actuators driving the shutter, aperture or the like are sensed by the magnetic sensor, thus interfering with accurate operation of the vibration reduction.

In addition, it has led to another problem: if the actuator is disposed so that the magnetic fields caused by these actuators do not influence the magnetic sensor, then the size of the apparatus cannot be reduced.

SUMMARY OF THE INVENTION

An object of the present invention is to provide a compact vibration reduction unit, a lens barrel, and a camera which can perform position detection with a high degree of accuracy during operation for vibration reduction.

The present invention achieves the above-mentioned object based on the following means.

According to the first aspect of the present invention, there is provided a vibration reduction unit comprising: a shooting optical system; a movable optical member that is part of the shooting optical system or which is another optical member, and which is provided movably relative to the shooting optical system; a magnetic sensor used to detect a position of the movable optical member; and a coil having a winding center line of a winding wire situated substantially in parallel with and on substantially the same plane as a plane in which the magnetic sensor is disposed.

In the vibration reduction unit, the magnetic sensor may configure such that a direction in which its sensitivity of magnetic detection is the highest is a direction substantially perpendicular to the given plane.

In the vibration reduction unit, the coil may form an actuator to drive a shutter or aperture.

The vibration reduction unit may be provided with a yoke configured to penetrate through the coil, the yoke comprising: a penetrating section configured to penetrate the winding center line of a winding wire of the coil; a first projecting section projecting to a first end side of the coil from the penetrating section; and a second projecting section projecting to a second end side of the coil on a side opposed to the first end side from the penetrating section, and being formed by folding back toward the first end side up to a position opposed to the first projecting section, wherein the unit is further provided with a magnet rotatably disposed in a position sandwiched between the first projecting section and the second projecting section.

In the vibration reduction unit, the magnet may be configured to have its rotational center substantially perpendicular to the given plane.

In the vibration reduction unit, the plane may be a plane perpendicular to an optical axis of the shooting optical system, and the magnetic sensor and the coil are configured to sandwich a virtual straight line perpendicular to the optical axis of the shooting optical system in the given plane.

In the vibration reduction unit, the coil may be constructed as a plurality of coils, the unit comprising: a shutter actuator including one of the coils to drive a shutter; and an aperture actuator including another one of the coils to drive an aperture, wherein a distance between the shutter actuator and the magnetic sensor is greater than a distance between the aperture actuator and the magnetic sensor.

According to the second aspect of the present invention, there is provided a lens barrel provided with the vibration reduction unit according to the first aspect of the present invention.

According to the third aspect of the present invention there is provided a camera comprising the vibration reduction unit according to the first aspect of the present invention.

According to the present invention, it is possible to provide a compact vibration reduction unit, a lens barrel and a camera, by which position detection can be realized with a high degree of accuracy during operations for vibration reduction.

BRIEF DESCRIPTION OF THE DRAWINGS

FIG. 5A is an illustration of a shutter unit under a shutter-closed condition when viewed in the +Z direction;

FIG. 5B is an illustration of a shutter unit under a shutter-opened condition when viewed in the +Z direction;

DETAILED DESCRIPTION OF THE PREFERRED EMBODIMENT

Figure 1:
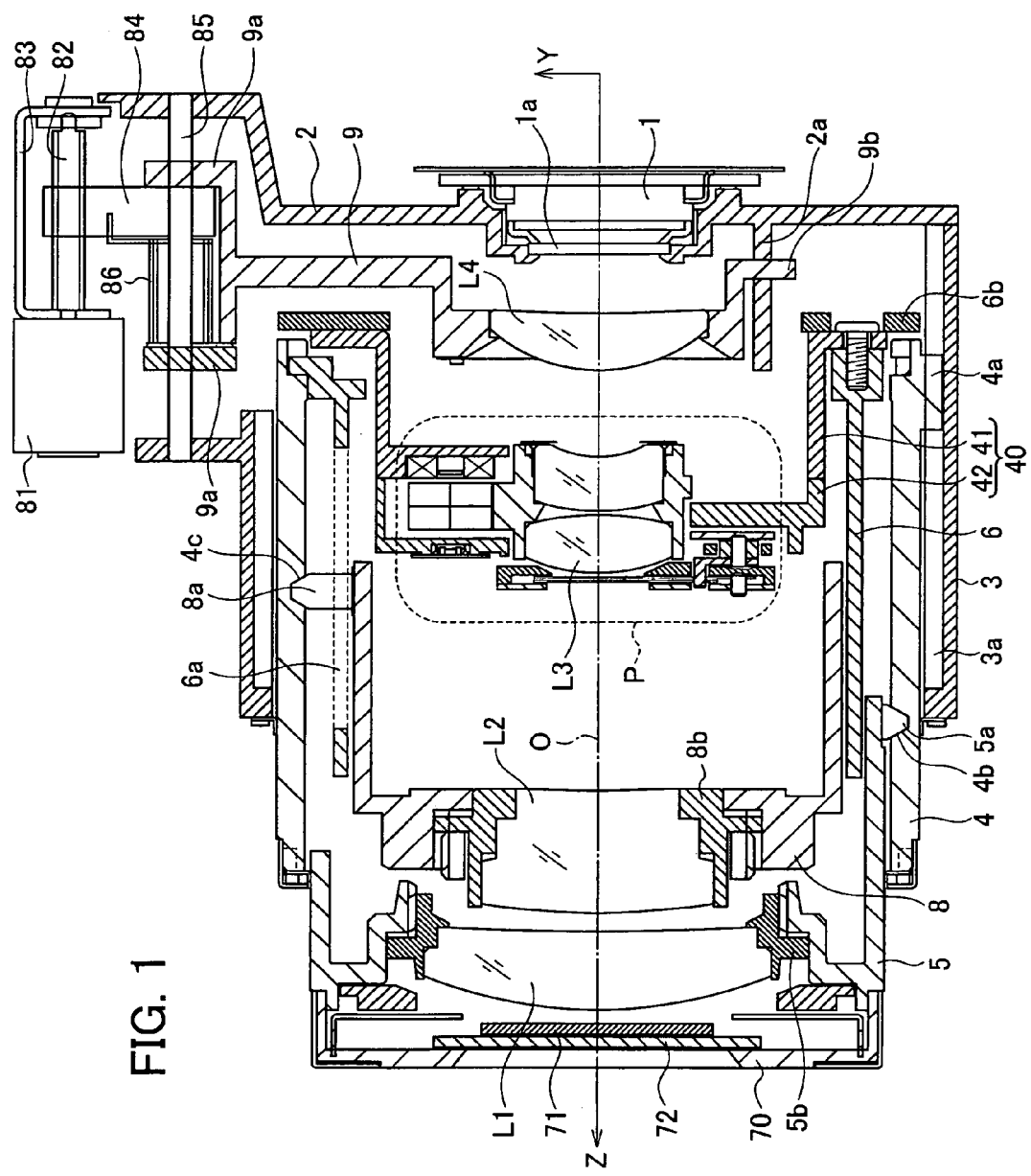
FIG. 1 is a cross-sectional view obtained by cutting a main part of a camera including a lens barrel of the present embodiment along an optical axis.

FIG. 1 is a cross-sectional view obtained by cutting a main part of a camera including a lens barrel of the present embodiment along an optical axis. FIG. 1 corresponds to the A-A cross section shown in FIGS. 4-6 described later.

Figure 2:
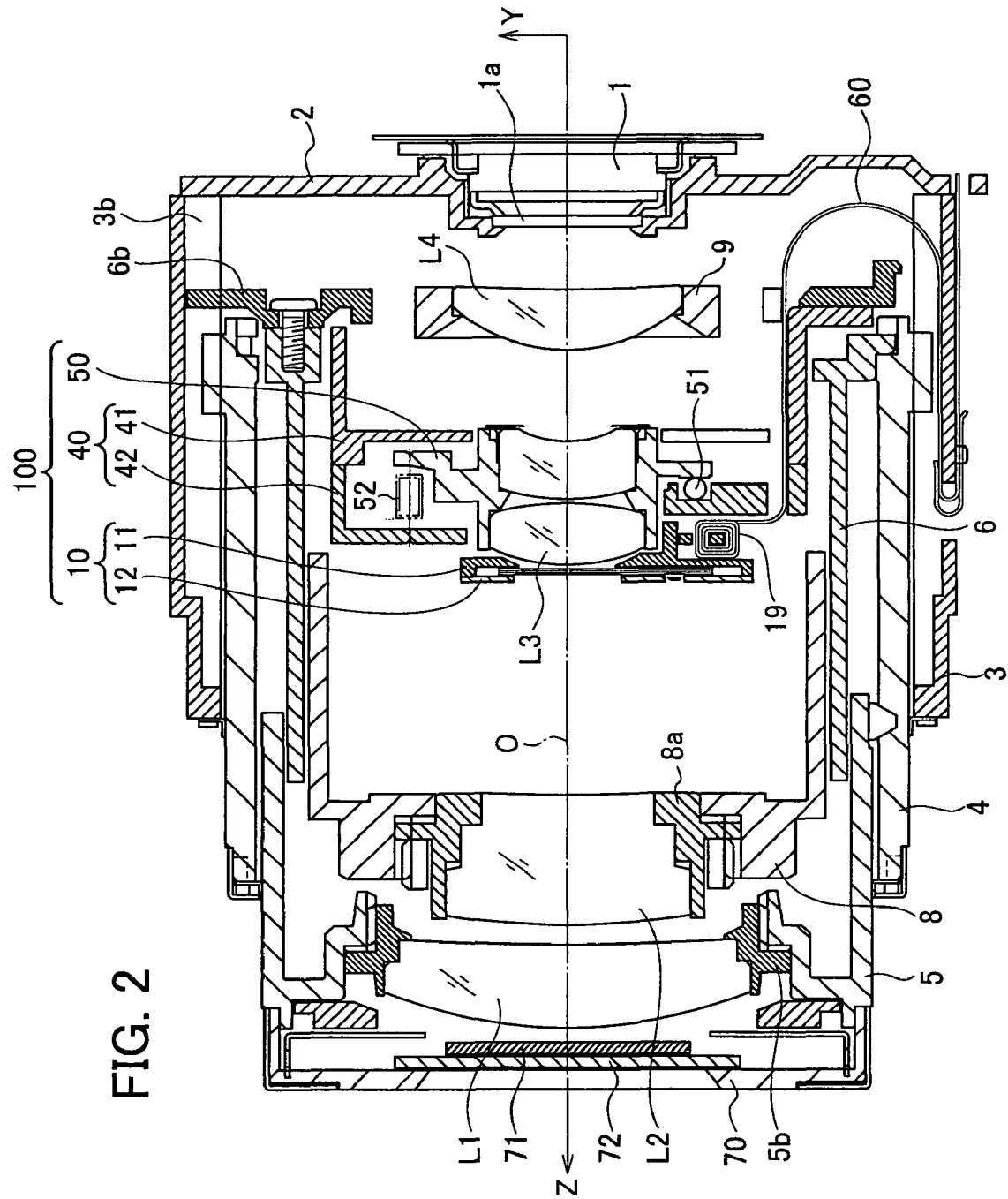
FIG. 2 is a cross-sectional view obtained by cutting a main part of a camera including a lens barrel of the present embodiment at an optical axis in a direction different from that in FIG. 1.

FIG. 2 is a cross-sectional view obtained by cutting a main part of a camera including a lens barrel of the present embodiment at an optical axis in a direction different from that in FIG. 1. FIG. 2 corresponds to the B-B cross section shown in FIGS. 4-6 described later.

Figure 3:
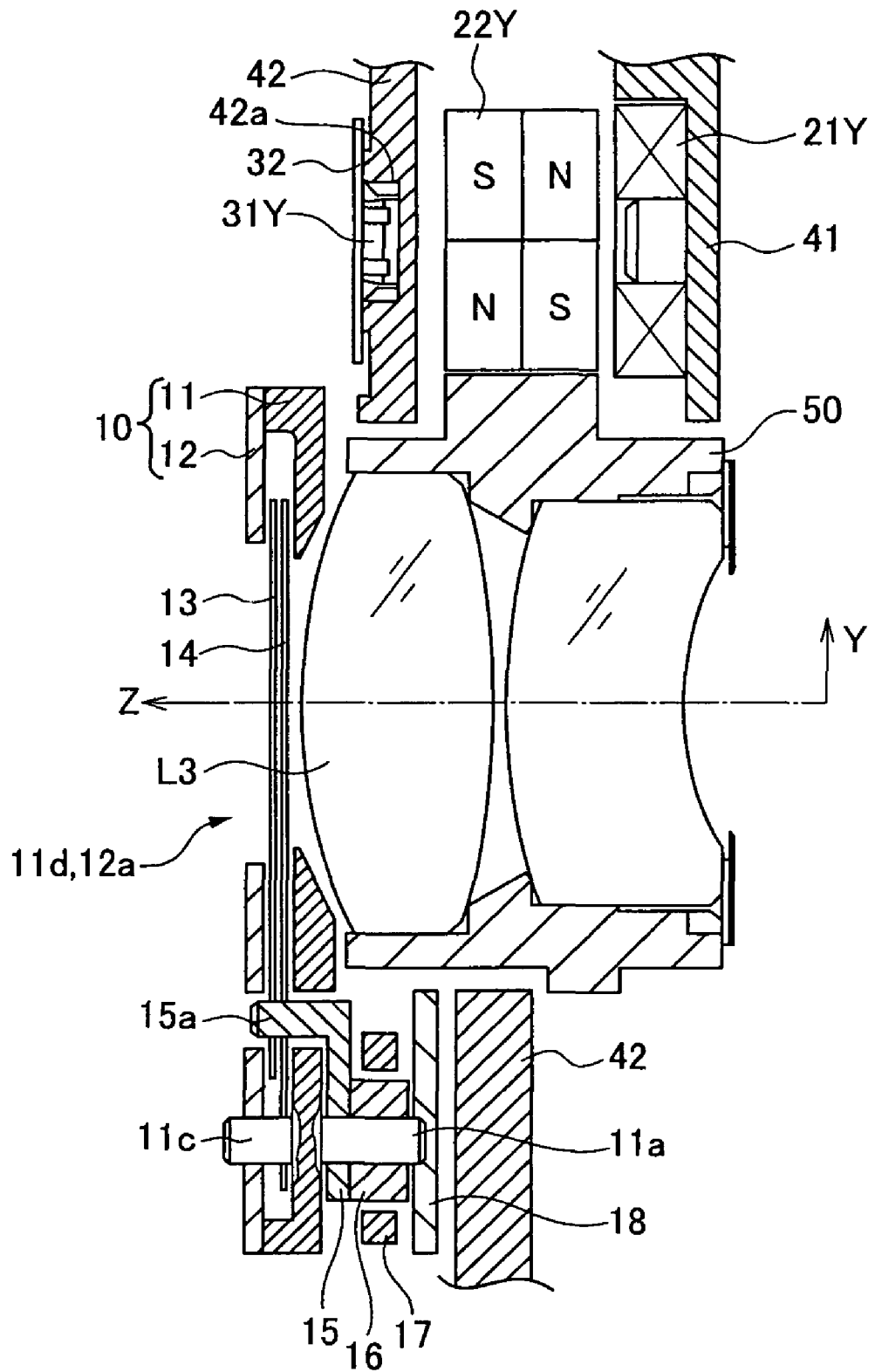
FIG. 3 is an enlarged view of an area P provided with a vibration reduction unit in FIG. 1.

FIG. 3 is an enlarged view of the area P provided with a vibration reduction unit 100 in FIG. 1.

Figure 4:
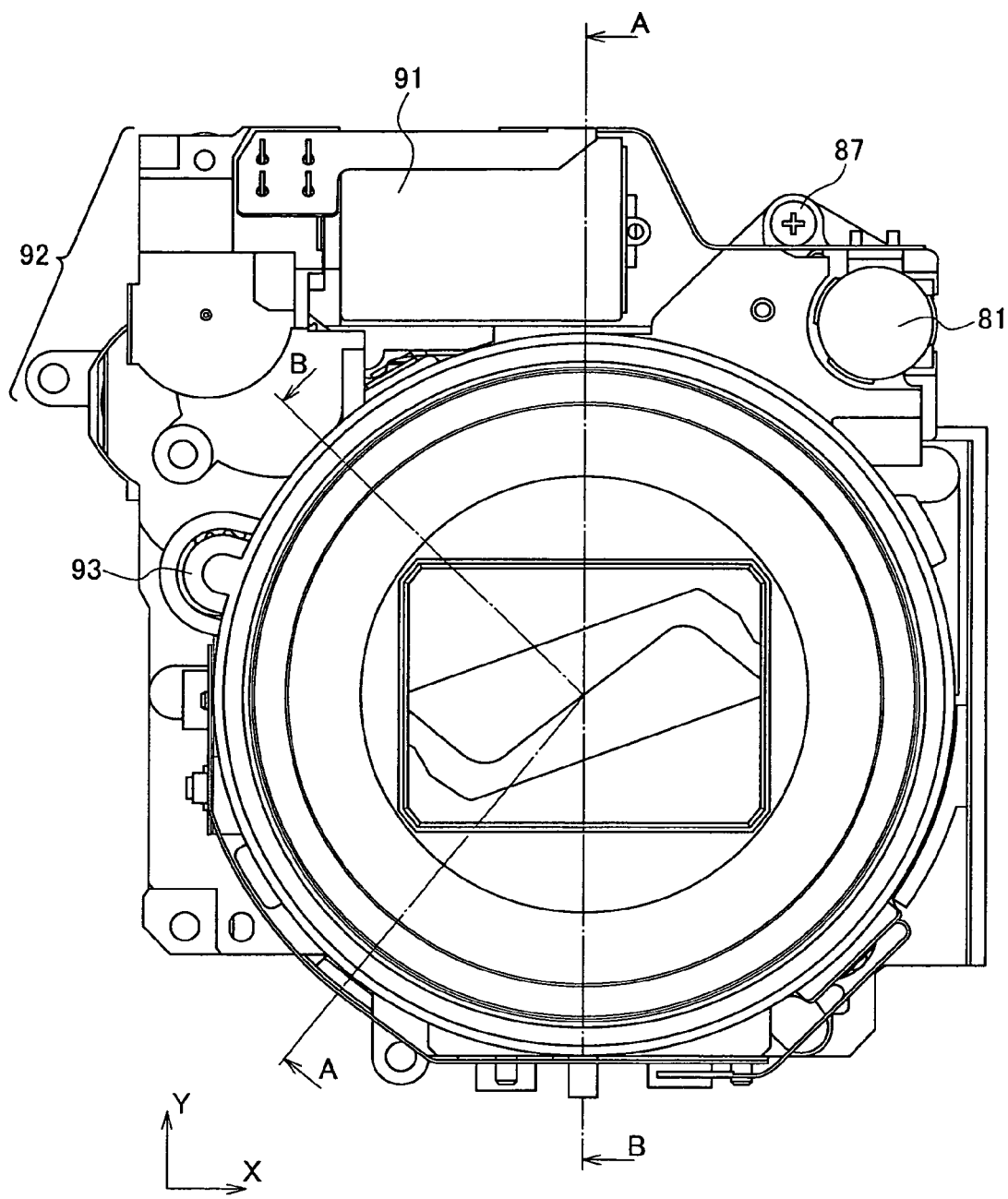
FIG. 4 is an illustration of a main part of a camera including a lens barrel of the present embodiment when viewed from a subject side.

FIG. 4 is an illustration of a main part of a camera including a lens barrel of the present embodiment when viewed from a subject side. FIG. 4 shows a situation in which barrier members 71 and 72 are closed.

It should be noted that the following figures, including these figures, are provided with X-Y-Z orthogonal coordinates in which an upper direction of the camera is set as the Y-plus direction when the camera is in the normal position, for the purpose of facilitating understanding. It is assumed that a right side thereof when viewed from a subject side in the optical axis direction is the X-plus direction and the subject side in the optical axis direction is the Z-plus direction. Here, a normal position means an orientation of a camera in which an optical axis O of the shooting optical system is horizontal and a longitudinal direction of a shooting screen is horizontal.

A camera of the present embodiment comprises a lens barrel secured to an image pickup device securing section 2 for fixing an image pickup device 1 and a low-pass filter 1a.

A lens barrel of the present embodiment is provided with a stationary tube 3, a cam tube 4, a first unit tube 5, a rectilinear tube 6, a second unit tube 8, a fourth group frame 9, a barrier unit 70, a vibration reduction unit 100 and so on, and has a 4-group-structured shooting optical system of a first lens group L1, a second lens group L2, a third lens group L3 and a fourth lens group L4.

The stationary tube 3 has a female helicoid 3a formed in its inner periphery, and is secured to the image pickup device securing section 2.

The cam tube 4 is disposed on an inner periphery side of the stationary tube 3, and a male helicoid 4a provided on an outer periphery thereof is screwed in the female helicoid 3a of the stationary tube 3. In addition, the inner periphery of the cam tube 4 is provided with cam grooves 4b and 4c in the spiral form. The male helicoid 4a has a gear teeth form with a helicoid, which is in meshing engagement with a long gear 93 extending lengthwise in a Z direction, via their gears. The long gear 93 is coupled with a zoom motor 91 via a gear unit 92. If the zoom motor 91 rotates, then the long gear 93 rotates via the gear unit 92, so a torque is applied to the cam tube 4 and it is rotationally driven.

The first unit tube 5 is disposed on an inner periphery side of the cam tube 4 and has a cam follower 5a in its outer periphery side, the cam follower 5a being in cam-engagement with the cam groove 4b of the cam tube 4. The first unit tube 5 holds the first lens group L1 via the first group frame 5b. Furthermore, a subject side front edge portion of the first unit tube 5 is provided with the barrier unit 70 having barrier members 71 and 72 that cover the first lens group L1 to protect the group in a unused state of the camera (a state of a trunk portion of the lens barrel being retracted).

The rectilinear tube 6 is disposed on an inner peripheral side of the first unit tube 5, and is configured to be rotatable relative to a −Z side end portion of the cam tube 4 and movable together with the cam tube 4 in the optical axis direction. On the −Z side of the rectilinear tube 6, a rectilinear guide 6b is secured by a screw. The rectilinear guide 6b is engaged with a rectilinear groove 3b extending in the Z direction in the stationary tube 3, so that rotation of the rectilinear tube 6 is regulated. Therefore, the rectilinear tube 6 moves in the optical axis direction in accordance with movement of the cam tube 4 without rotation. In addition, the vibration reduction main body unit 40 included in the vibration reduction unit 100 is secured to the rectilinear tube 6.

The second unit tube 8 holds a second lens group L2 via the second group frame 8b and is disposed on an inner periphery side of the rectilinear tube 6, and a follower pin 8a is fixed thereon. This follower pin 8a is engaged with the cam groove 4c of the cam tube 4 through a rectilinear groove 6a provided in the rectilinear tube 6 along the optical axis direction. Therefore, if the cam tube 4 rotates, then the second unit tube 8 moves in the optical axis direction.

The fourth group frame 9 holds the fourth lens group L4 and is supported by fitting sections 9a fitted in a guide shaft 85 provided in two locations in parallel with the optical axis O and a rotation-stopper section 9b engaged with a rotation-stopper shaft 2a parallel with the guide shaft 85, and thereby can move along the optical axis O. The fourth group frame 9 gains a driving force from a stepping motor 81 provided with an output shaft aligned parallel with the guide shaft 85 and is driven in a direction along the optical axis O so as to perform a focusing operation.

As a mechanism for driving the fourth group frame 9, the output shaft of the stepping motor 81 is fitted with a lead screw 82 using a supporting member 83. This supporting member 83 is a member fixed on the stationary tube 3 using a screw 87 (see FIG. 4) and another screw or screws (not shown). There is provided a rack member 84 in which a rack tooth section (not shown) engaged with the lead screw 82 is formed and which is movable along the guide shaft 85 while being fitted in the guide shaft 85. The rack member 84 is biased in a direction in which the rack teeth are brought into butt-contact with the lead screw 82 by a coil spring 86, while being biased in a direction in which the teeth are brought into butt-contact with the fitting section 9a provided on the −Z side in a position sandwiched between the fitting sections 9a.

FIG. 5 is illustration of a shutter unit 10 when it is viewed in a +Z direction. FIG. 5A shows a shutter-closed condition, and FIG. 5B shows a shutter-opened condition.

Figures 6A, 6B:
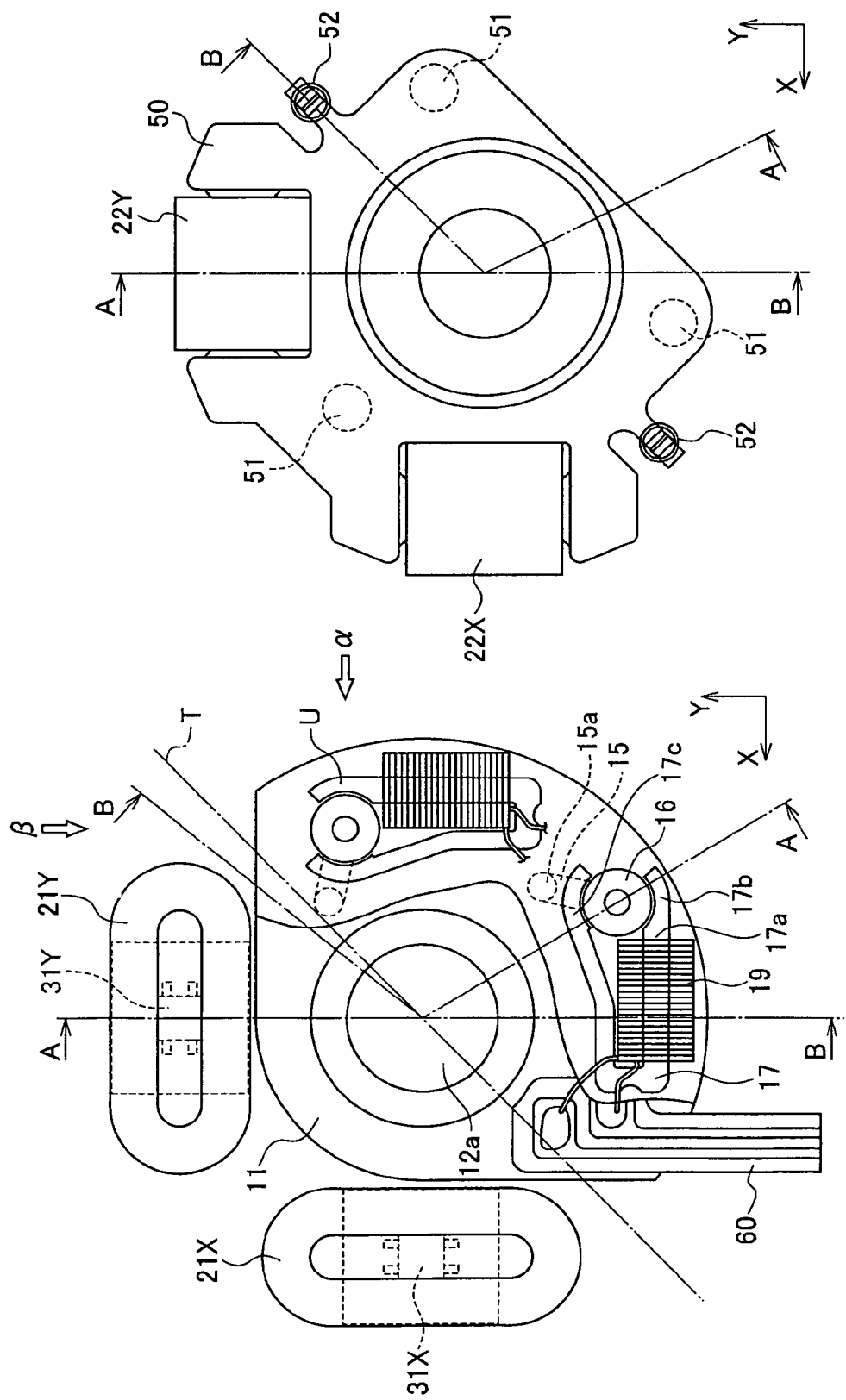
FIG. 6A is an illustration of a shutter unit and a vibration reduction movable unit when viewed in the −Z direction, which shows a Hall element and a VCM coil together with the shutter unit.
FIG. 6B is an illustration of a shutter unit and a vibration reduction movable unit when viewed in the −Z direction, which shows the vibration reduction movable unit.

FIG. 6 is an illustration of the shutter unit 10 and a vibration reduction movable unit 50 when they are viewed in a −Z direction. FIG. 6A shows Hall elements 31X, 31Y and VCM coils 21X, 21Y together with the shutter unit 10, and FIG. 6B shows the vibration reduction movable unit 50.

The vibration reduction unit 100 will be described hereinafter mainly with reference to FIGS. 2, 3, 5 and 6.

The vibration reduction unit 100 is provided with the shutter unit 10, the vibration reduction main body unit 40, the vibration reduction movable unit 50 and so on.

The shutter unit 10 is provided with a shutter base 11, a shutter lid 12, shutter blades 13, 14, a shutter actuator 15, 16, 17, 19 for driving them and so on, and the shutter base 11 is fixed on the vibration reduction main body unit 40 (its fixed part is not shown).

In addition, the shutter unit 10 is provided with one aperture member (not shown) having a circular opening for limiting a shot light ray passing therethrough and an aperture actuator U for driving this aperture member to advance and retract in a shooting optical path (FIG. 6A). The form of the aperture member is a publicly known form, and the aperture actuator U for driving the aperture blades has the same form as the shutter actuators 15, 16, 17, 19 of the present embodiment. Therefore, the following description will omit a discussion of the aperture actuator U for the purpose of facilitating understanding. It should be noted that the form of the aperture may be a form for driving a plurality of aperture blades forming an iris diaphragm.

The shutter base 11 and the shutter lid 12 support the shutter blades 13 and 14 in the form of the blades being sandwiched between them, and are provided with openings 11d and 12a in an area through which the shot light ray passes with the optical axis O being its center.

On the +Z side of the shutter base 11, a shaft 11b and a shaft 11c are provided away at a predetermined distance in positions situated on a −X side and a −Y side with respect to the optical axis O. In addition, a shaft 11a is provided in a position coaxial with the shaft 11c on a −Z side of the shutter base 11. It is noted that the shaft 11a and the shaft 11c may have no relations of coaxial configuration.

The shutter blades 13 and 14 are plate-shaped members having a light shield effect, which are arranged perpendicularly to the optical axis O in the close vicinity of the +Z side of the third lens group L3, and are supported while being sandwiched between the shutter base 11 and the shutter lid 12.

The shutter blade 13 is opened up with a rotational center hole 13b, and this rotational center hole 13b is fitted around the shaft 11b. In addition, the shutter blade 13 is opened up with a substantially rectangular lever engagement hole 13a, and this lever engagement hole 13a is engaged with a shutter lever 15, described later, with the lever 15 penetrating through the hole 13a.

In similar manner to the shutter blade 13, the shutter blade 14 is opened up with a rotational center hole 14b, and this rotational center hole 14b is fitted around the shaft 11c. In addition, the shutter blade 14 is opened up with a substantially rectangular lever engagement hole 14a, and this lever engagement hole 14a is engaged with an engagement protrusion 15a of the shutter lever 15, described later, with the protrusion 15a penetrating through the hole 14a.

Therefore, if the shutter lever 15 rotates, then the shutter blade 13 and the shutter blade 14 are rotationally driven around their respective rotational center holes 13b and 14b, and move between a shutter closed state shown in FIG. 5A and a state of a shutter opened state shown in FIG. 5B.

The shutter actuator 15, 16, 17, 19 is provided with the shutter lever 15, a shutter magnet 16, a shutter yoke 17 and a shutter coil 19.

Figure 7:
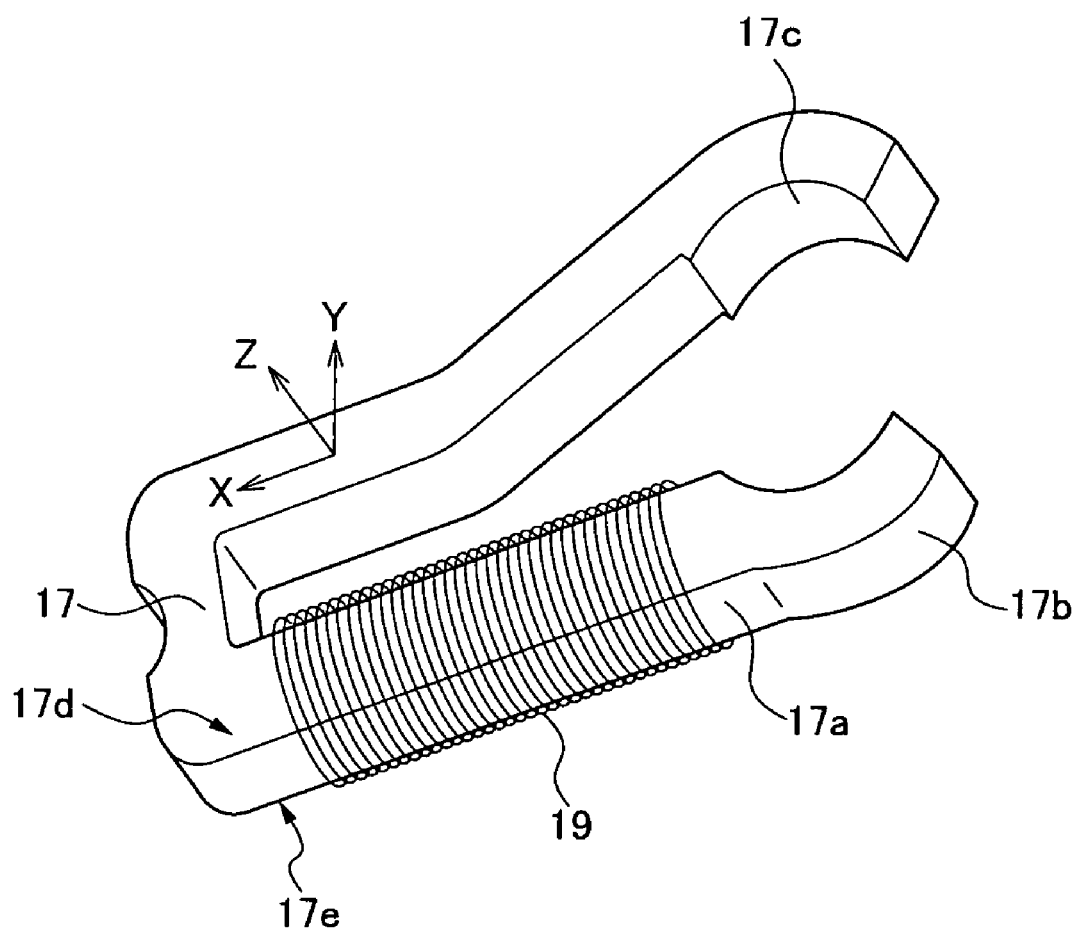
FIG. 7 is a perspective view showing a shutter yoke and a shutter coil.

FIG. 7 is a perspective view showing the shutter yoke 17 and the shutter coil 19.

The shutter coil 19 is an electromagnetic coil for which a winding wire consisting of an electric conductor is wound with a large number of turns, and is configured in such a manner that the winding center line of the winding wire is parallel to the X direction in a position situated more towards the −Y side than the third lens group L3 and situated more towards the −Z side than the shutter blades 13 and 14. The shutter coil 19 is connected to a shutter flexible printed wiring board 60, and if electric power is supplied thereto a driving circuit, not shown, then a magnetic field is generated in a direction along the center line of the winding wire.

The shutter yoke 17 is a member that consists of a metal material and is configured to penetrate through a center line of the shutter coil 19 for guiding the magnetic force generated by the shutter coil 19.

The shutter yoke 17 comprises a penetrating section 17a, a first projecting section 17b and a second projecting section 17c.

The penetrating section 17a is a part configured to penetrate through a portion of a winding center line of the winding wire of the shutter coil 19 along this center line (namely, in parallel with the X direction).

The first projecting section 17b is a part projecting to an end side (a first end side) on the −X side of the shutter coil 19 from the penetrating section 17a.

The second projecting section 17c is a part that projects to an end side (a second end side) on the +X side of the shutter coil 19 from the penetrating section 17a and is formed by folding it back in a direction (the −X direction) toward the first end side on an X-Y place up to a position facing to the first projecting section 17b.

With the shutter yoke 17 taking such a configuration, the magnetic force generated by the shutter coil 19 is induced for the first projecting section 17b and the second projecting section 17c, and so, for example, if a north pole is generated in the first projecting section 17b, then a south pole is generated in the second projecting section 17c.

In a position sandwiched between the first projecting section 17b and the second projecting section 17c, a circular ring shaped shutter magnet 16 is disposed to be able to rotate while fitted around the shaft 11a. The shutter magnet 16 is magnetized to have different poles i.e., north and south poles, in its circumferential direction.

The shutter lever 15 is bonded to the shutter magnet 16 in an integrated fashion. In a position away from the rotational center of the shutter lever 15, an engagement protrusion 15a is provided to protrude in the +Z direction, and this engagement protrusion 15a penetrates through an opening provided in the shutter base 11 and is engaged with a lever engagement hole 13a and a lever engagement hole 14a.

If the current-carrying direction for the shutter coil 19 is changed, then the north and south poles for the first projecting section 17b and second projecting section 17c are exchanged, and the shutter lever 15 rotates together with the shutter magnet 16 by virtue of attraction and repulsion effects between the first projecting section 17b and second projecting section 17c and the shutter magnet 16. This rotation of the shutter lever 15 causes the shutter blades 13 and 14 to be driven to perform opening and closing operations of the shutter. It should be noted that in this shutter actuator 15, 16, 17, 19, the positions of the magnet and the shutter lever 15 are maintained due to the attraction effect caused between the shutter yoke 17 and the shutter magnet 16 even in the case where current-carrying for the shutter coil 19 does not take place.

The vibration reduction main body unit 40 is a part that takes a substantially cylindrical form, movably holds a vibration reduction movable unit 50 described later and functions as a base of the vibration reduction mechanism. The vibration reduction main body unit 40 is formed in such a manner that the first main body section 41 and the second main body section 42 provided more towards the +Z side than the first main body section are fixed to each other. Since the first main body section 41 is fixed on the rectilinear tube 6, the vibration reduction main body unit 40 moves simultaneously with the rectilinear tube 6 in the optical axis direction.

A VCM coil 21X and a VCM coil 21Y are provided on a side (+Z side) of the first main body section 41 opposed to the second main body section 42. It should be noted that the VCM (Voice Coil Motor) means an actuator for generating a driving force for driving the vibration reduction movable unit 50 described later.

The VCM coil 21X is provided on a +X side with respect to the optical axis O, and the VCM coil 21Y is provided on the +Y side with respect to the optical axis O. The VCM coils 21X and 21Y are configured in such a manner that the center lines of their winding wires are oriented in a direction parallel with the optical axis O.

On the +Z side of the second main body section 42, a Hall element 31X is disposed in a position overlapping with the VCM coil 21X when viewed in the Z direction, and a Hall element 31Y is disposed in a position overlapping with the VCM coil 21Y. The Hall elements 31X and 31Y are fixed being inserted in a bore 42a provided in the second main body section 42.

The Hall elements 31X and 31Y are magnetic sensors that detect changes of magnetism generated by magnets 22X and 22Y described later to detect the positions of the vibration reduction movable unit 50 in the X direction and a Y direction, respectively.

Hall elements have a direction (hereinafter, referred to as "sensitive direction") in which the sensitivity of magnetic detection is high, which is set for each kind of Hall element, and can detect even small fluctuations of the magnetism and output a corresponding electric current in terms of that sensitive direction. On the other hand, for directions other than the sensitive direction, in particular a direction orthogonal to the sensitive direction, Hall elements do not detect small fluctuations of the magnetism if any, and their output current remains substantially unchanged.

The Hall elements 31X and 31Y of the present embodiment have a rectangular parallelepiped shape having a small thickness in one direction and the sensitive direction set to the direction in which their thickness becomes smaller, and use a plane perpendicular to their detecting direction as the detecting plane. Then, the Hall elements 31X and 31Y, having their detecting planes facing the −Z side, are mounted on the position detecting flexible printed wiring board 32 situated on the +Z side, and both have their sensitive directions parallel with the Z direction.

The position detecting flexible printed wiring board 32 is connected to a lens CPU, not shown, and the Hall elements 31X and 31Y transfer currents corresponding to the magnetism detected by the Hall elements 31X and 31Y to the lens CPU. It should be noted that the lens CPU computes the position of the vibration reduction movable unit 50 based on the currents corresponding to the resultant magnetism.

The vibration reduction movable unit 50 holds the third lens group L3, and is provided to be movable in the X-Y plane perpendicular to the optical axis O within the vibration reduction main body unit 40, i.e., in a position sandwiched between the first main body section 41 and the second main body section 42. The third lens group L3 is a vibration reduction optical system that can move the position of the image formed on the image pickup device 1 on the basis of the group's movement in a direction perpendicular to the optical axis O. In the present embodiment, the third lens group L3 held by the vibration reduction movable unit 50 is moved in a plane perpendicular to the optical axis O in accordance with blurring of the camera caused by hand, which has been detected by a blur detecting section having an angular velocity sensor (not shown) and so on, so as to perform the vibration reduction operations for reducing image blur.

Three balls 51 are provided at substantially equal intervals in a circumferential direction using the optical axis O as their center between the vibration reduction movable unit 50 and the second main body section 42. In addition, the vibration reduction movable unit 50 and the second main body section 42 are bridged with a tensile coil spring 52 so as to bias the vibration reduction movable unit 50 toward the side of the second main body section 42. Therefore, the vibration reduction movable unit 50 can smoothly move in the X-Y plane perpendicular to the optical axis O relative to the vibration reduction main body unit 40.

In the vibration reduction movable unit 50, the magnet 22X is fixed in a position corresponding to the VCM coil 21X and Hall element 31X, and the magnet 22Y is fixed in a position corresponding to the VCM coil 21Y and Hall element 31Y. These magnets 22X and 22Y form a VCM in the sense of their relationship with the VCM coil 21X and 21Y. Additionally, the magnets 22X and 22Y form a position detecting device for the vibration reduction movable unit 50 in the sense of their relationship with the Hall elements 31X and 31Y.

The magnet 22Y has its north and south poles separated in the Y direction and Z direction, respectively, as shown in FIG. 3, and thus has a total of 4 poles including the north and south poles. By this arrangement, the lines of magnetic force reaching the VCM coil 21Y and the Hall element 31Y from the magnet 22Y will include many components parallel with the Z direction. Therefore, this leads to an advantage in terms of the driving characteristic of the VCM. Furthermore, since the direction of the lines of magnetic force substantially correspond to the sensitive direction of the Hall element 31Y, the positional detection accuracy obtained by the Hall element 31Y can be made higher. The magnet 22X is provided a similar manner to the magnet 22Y.

The Hall elements 31X and 31Y detect magnetism from the magnets 22X and 22Y, which changes with movement of the vibration reduction movable unit 50. At this time, the VCM coils 21X and 21Y are energized in order to drive the vibration reduction movable unit 50, and the magnetism generated from these VCM coils 21X and 21Y also changes. However, since the magnets 22X and 22Y are provided to have a sufficiently larger area than the detecting planes of the Hall elements 31X and 31Y between the Hall elements 31X, 31Y and the VCM coils 21X, 21Y, the Hall elements 31X and 31Y can perform accurate positional detection without suffering from the effects of the magnetism generated by the VCM coils 21X and 21Y.

Therefore, the vibration reduction movable unit 50 can be driven in the X-Y plane perpendicular to the optical axis O while being subjected to positional control relative to the vibration reduction main body unit 40.

Herein, since the Hall elements 31X and 31Y detect the position of the vibration reduction movable unit 50 by detecting changes of the magnetism as described above, the positional detection accuracy may be affected if they detect magnetism other than the magnetism generated by the magnets 22X and 22Y. The magnetism generated by the VCM coils 21X and 21Y has almost no influence on the Hall elements 31X and 31Y as previously described. In the present embodiment, the shutter actuator 15, 16, 17, 19 and the aperture actuator U are mentioned as constituents that may have an effect of magnetism on the Hall elements 31X and 31Y other than the magnets 22X, 22Y and the VCM coils 21X, 21Y.

For this reason, the present embodiment is intended to improve the arrangement relationship between the coil (shutter coil 19) involved in the shutter actuator 15, 16, 17, 19 and aperture actuator U, and the Hall elements 31X, 31Y, to thereby reduce the effect of the magnetism generated by the shutter actuator 15, 16, 17, 19 and aperture actuator U on the Hall elements 31X and 31Y.

Hereinafter, an explanation will be given concerning the points of improvement of an arrangement relationship between the Hall elements 31X, 31Y and the shutter coil 19.

(Improvement 1)

Figure 8:
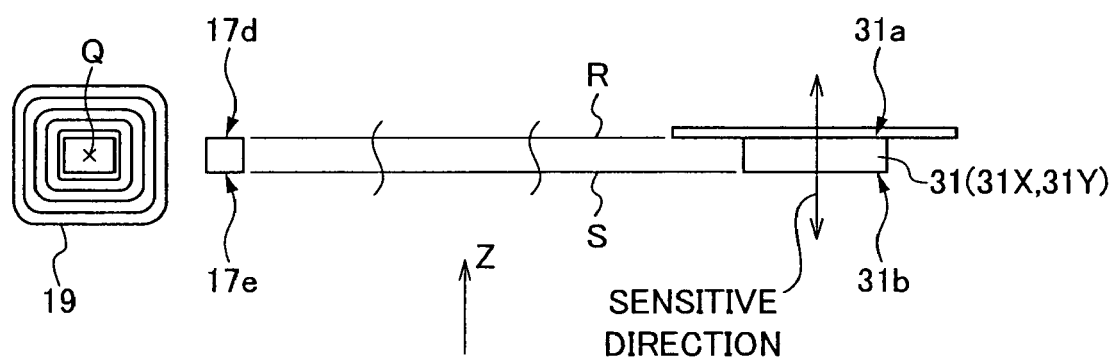
FIG. 8 is an illustration showing the positional relationship between a Hall element and a shutter coil in the Z direction.

FIG. 8 is an illustration showing the positional relationship between the Hall elements 31X, 31Y and the shutter coil 19 in the Z direction.

In the present embodiment, a winding center line Q of a winding wire of the shutter coil 19 (in FIG. 8, passing through a position denoted by Q and extending in a thickness direction of the paper) is aligned to be parallel with the plane in which the Hall elements 31X and 31Y are placed (a virtual plane, in the present embodiment, an X-Y plane). In addition, the winding center line Q of the winding wire of the shutter coil 19 has its position in the Z direction, which is determined in such a manner that the line Q is on the same plane as the plane in which the Hall elements 31X and 31Y are placed.

Herein, the Hall elements 31X and 31Y have a thickness in the Z direction. In the present embodiment, the arrangement is made in order for the position of the winding center line Q of the winding wire of the shutter coil 19 in the Z direction to correspond to a center position of the thickness of the Hall elements 31X and 31Y in the Z direction. Additionally, in the present embodiment, the thickness of the shutter yoke 17 in the Z direction corresponds to the thickness of the Hall elements 31X and 31Y in the Z direction. Therefore, the arrangement is made in such a manner that the plane 17d of the shutter yoke 17 on the +Z side and the plane (mounting side plane) 31a of the Hall elements 31X and 31Y on the +Z side are on the same plane R, and the plane 17e of the shutter yoke 17 on the −Z side and the plane (detecting plane) 31b of the Hall elements 31X and 31Y on the −Z side are on the same plane S.

In addition, the sensitive directions of the Hall elements 31X and 31Y are oriented in a direction parallel with the optical axis O as previously described. Therefore, the sensitive directions are oriented in a direction perpendicular to the above-mentioned vertical plane in which the Hall elements 31X, 31Y and the shutter coil 19 are placed in the Z direction.

Figure 9A:
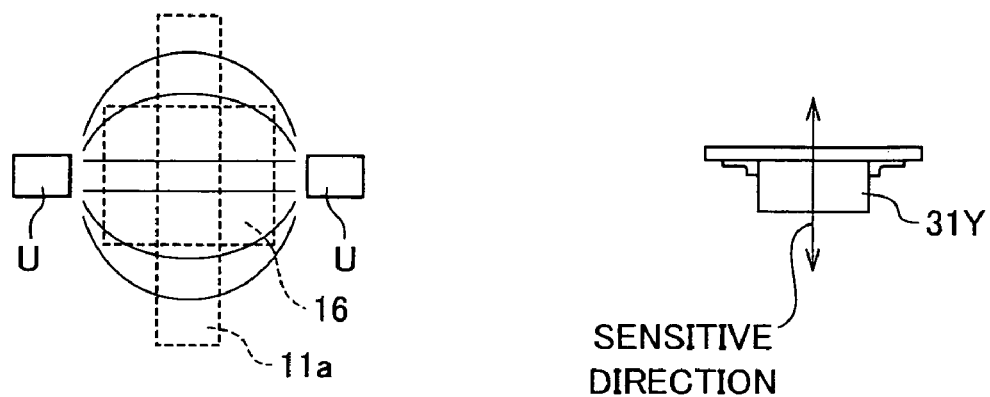
FIG. 9A is a view from a direction β in FIG. 6 and shows actually generated lines of magnetic force.
Figure 9B:
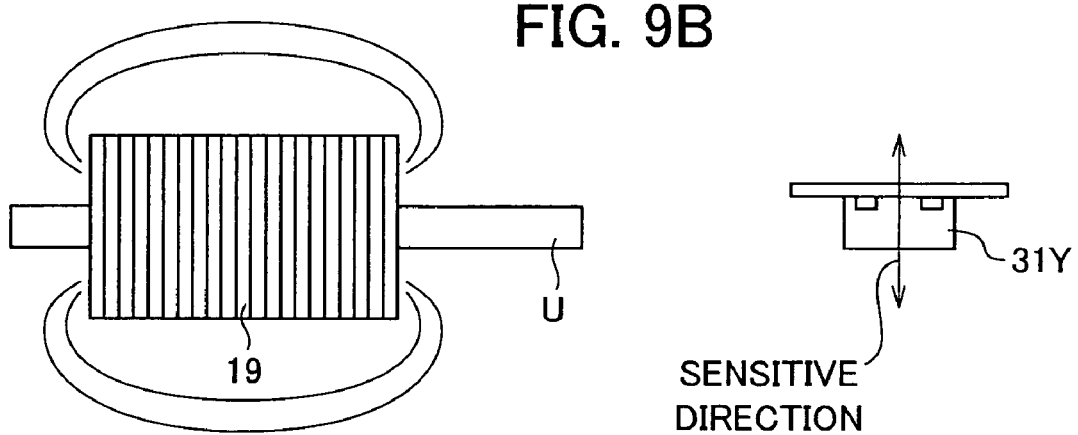
FIG. 9B is a view from a direction α of FIG. 6 and shows actually generated lines of magnetic force.

FIG. 9 shows actually generated lines of magnetic force. FIG. 9A is a view from a direction β in FIG. 6, and FIG. 9B is a view from a direction α of FIG. 6. In the figures, portions outside of the Hall device 31Y, the coil 19, and the aperture actuator U are omitted. Furthermore, the lines of magnetic force are shown by dashed lines. As shown in the figure, the lines of magnetic force generated by the coil 19 are very sparse even when they reach the neighborhood of the Hall device 31Y.

By virtue of positioning the Hall elements 31X, 31Y and the shutter coil 19 in the above-described relationship, even if the lines of magnetic force generated by the shutter-coil 19 reach the Hall elements 31X and 31Y, the lines of magnetic force arriving in a direction near the sensitive directions of the Hall elements 31X and 31Y are remarkably reduced. Therefore, the Hall elements 31X and 31Y are not readily affected by the magnetism generated by the shutter coil 19.

The above-described relationship in the present embodiment is preferred for the positional relationship between the Hall elements 31X, 31Y and the shutter coil 19 in the Z direction, but a wider range of arrangements may be realized as in the following modified forms, depending on the strength of the magnetism generated by the shutter coil 19 and the sensitivities of the Hall elements 31X and 31Y.

(First Modified Form of Improvement 1)

In the case that the influence on the Hall elements 31X and 31Y due to the magnetism generated by the shutter coil 19 is small, the positional relationship between the Hall elements 31X, 31Y and the shutter coil 19 may be as follows.

The position of the winding center line Q of the winding wire of the shutter coil 19 in the Z direction is not limited to the center position of a thickness of the Hall elements 31X and 31Y in the Z direction, and may be provided between the plane (mounting side plane) 31a of the Hall element 31X and 31Y on the +Z side and the plane (detecting plane) 31b of the same on the −Z side. In this way, it is possible provide more freedom with respect to design and to achieve easier manufacture without requiring a high degree of assembly accuracy.

(Second Modified Form of Improvement 1)

In the case that the influence on the Hall elements 31X and 31Y due to the magnetism generated by the shutter coil 19 is small, the positional relationship between the Hall elements 31X, 31Y and the shutter coil 19 may be as follows. The position of the shutter yoke 17 in the Z direction may be a position in which at least a part of the shutter yoke 17 is put within the range of the thickness of the Hall elements 31X and 31Y in the Z direction (within a range sandwiched between the virtual plane obtained by extending the plane 31a on the mounting side and the virtual plane obtained by extending the detecting plane 31b). In this way, it is possible to further increase the freedom with respect to design and to achieve easier manufacture.

The condition of any one of the above-described Improvement 1 of the present embodiment and the two modified forms is herein defined as a condition in which the winding center line Q of the winding wire of the shutter coil 19 is substantially in parallel with the plane in which the Hall elements 31X and 31Y are placed and substantially on a plane identical with the plane in which the Hall elements 31X and 31Y are placed.

(Improvement 2)

In the present embodiment, the arrangement relationship in the X-Y plane is improved as follows, in addition to the above-mentioned Improvement 1 which improves the arrangement relationship in the Z direction.

The Hall elements 31X, 31Y and the shutter coil 19 are arranged to sandwich a virtual straight line (see FIG. 6A) perpendicular to the optical axis O in the X-Y plane. Also as for the aperture actuator U, its relation with the Hall elements 31X, 31Y such that it is positioned sandwiching the virtual straight line T similarly to the shutter coil 19. This virtual straight line T is a virtual line drawn to pass through the optical axis O and to pass between the Hall elements 31X, 31Y, and the shutter actuator 15, 16, 17, 19 and aperture actuator U.

With this arrangement, it is possible to sufficiently extend the distance between the Hall elements 31X, 31Y and the shutter coil 19, and to further reduce the influence on the Hall elements 31X and 31Y due to the magnetism generated by the shutter coil 19. It should be noted that the distance between the Hall elements 31X, 31Y and the shutter coil 19 is desirably 5 mm or more of separation, from the above-mentioned viewpoint, and the arrangement described above leads to 5 mm or more of separation between them in typically envisaged cameras.

The aperture actuator U is disposed in the present embodiment as stated above. The constitution and arrangement form in the Z direction for this aperture actuator U is equal to those of the above-described shutter actuator 15, 16, 17, 19. The Hall elements 31X and 31Y, therefore, is not subjected to a reduction in detection accuracy due to the effect of magnetism generated by the coil of the aperture actuator U.

Herein, the shutter actuator 15, 16, 17, 19 is configured to have a greater interval between the shutter actuator 15, 16, 17, 19 and the Hall elements 31X, 31Y than an interval between the aperture actuator U and the Hall elements 31X, 31Y. Driving of the aperture does not take place at a time at which a shot image is being actually captured by the image pickup device 1. Therefore, even if magnetism generated by the aperture actuator U affects the detection accuracy of the Hall elements 31X and 31Y when executing aperture-driving during a vibration reduction operation, no direct influence is exerted on the shot image. On the other hand, driving of the shutter takes place at the time at which a shot image is being actually captured by the image pickup device 1. Therefore, it is necessary to prevent a reduction in the detection accuracy of the Hall elements 31X and 31Y at the time of shutter driving. For this reason, the shutter actuator 15, 16, 17, 19 is configured to have a greater interval between the shutter actuator 15, 16, 17, 19 and the Hall elements 31X, 31Y than the interval between the aperture actuator U and the Hall elements 31X, 31Y. By doing so, in case that the magnetism generated by the shutter actuator 15, 16, 17, 19 reaches the Hall elements 31X and 31Y, the influence can be reduced.

According to the present embodiment, the positional relationship between the shutter actuator 15, 16, 17, 19 and aperture actuator U and the Hall elements 31X, 31Y is improved, and thereby the Hall elements 31X and 31Y can keep a high degree of detection accuracy even if the distance between the shutter actuator 15, 16, 17, 19 and aperture actuator U and the Hall elements 31X, 31Y is shortened. Therefore, miniaturization of the lens barrel and the camera can be achieved.

(Modified Form)

The present invention is not limited to the above-described embodiment(s), and various modifications and alterations may be made which are also within the scope of the invention.

(1) There has been given an example of use of the Hall elements 31X and 31Y as sensors for detecting the position of the vibration reduction movable unit 50 in the present embodiment, but the invention is not limited to this and may use any other magnetic sensors sensing the magnetism, including an MI (Magneto Impedance) sensor, a magnetic resonance type magnetic field detecting device, an MR (Magneto-Resistance) device and so on, to name a few.

(2) In the present embodiment, a description has been given by way of an example of a digital camera, but the invention is not limited to this and applicable to, for example, a vibration reduction unit and a lens barrel provided therewith in any other optical equipment such as a video camera, a field scope or a binocular telescope.

(3) In the present embodiment, a description has been given by way of an example of providing both the shutter actuator 15, 16, 17, 19 and the aperture actuator U, but the invention is not limited to this, and for example, only one of them may be provided, and any other actuators for driving some part quite different from the shutter and aperture may be configured in the above-described manner.

(4) In the present embodiment, a description has been given by way of an example of the Hall elements 31X and 31Y detecting the position of the vibration reduction movable unit 50 when the vibration reduction operation is carried out by moving the third lens group L3, but the invention is not limited to this, and may be applicable to, for example, a magnetic sensor for detecting the position of the camera performing a vibration reduction operation by moving the image pickup device.

What is claimed is:

1. A lens barrel, comprising:
a shooting optical system;
a movable optical member that is part of the shooting optical system or which is another optical member, and which is provided movably relative to the shooting optical system;
a vibration reduction unit including a first actuator that drives the movable optical member and a magnetic sensor configured to detect a position of the movable optical member; and
a second actuator different from the first actuator, the second actuator including a coil having a winding center line of a winding wire provided in a direction that intersects with a direction in which a sensitivity of magnetic detection of the magnetic sensor is the highest, wherein
the first actuator is disposed on one side of the movable optical member and the coil is disposed on an opposite side of the movable optical member such that the movable optical member is sandwiched between the first actuator and the coil,
the second actuator is provided such that at least part of the second actuator overlaps the vibration reduction unit in a direction of an optical axis of the shooting optical system, and
the winding center line of the winding wire is situated substantially in parallel with and in substantially the same plane as a plane in which the magnetic sensor is disposed.

2. The lens barrel according to claim 1, wherein the coil forms the second actuator to drive a shutter or aperture.

3. The lens barrel according to claim 2,
wherein the second actuator comprises a yoke configured to penetrate through the coil,
the yoke comprising:
a penetrating section configured to penetrate the winding center line of the winding wire of the coil;
a first projecting section projecting to a first end side of the coil from the penetrating section;
a second projecting section projecting to a second end side of the coil on a side opposed to the first end side from the penetrating section, and being formed by folding back toward the first end side up to a position opposed to the first projecting section; and
a magnet rotatably disposed in a position sandwiched between the first projecting section and the second projecting section.

4. The lens barrel according to claim 3, wherein
the magnet is configured to have its rotational center substantially perpendicular to the plane in which the magnetic sensor is disposed.

5. The lens barrel according to claim 1, wherein
the plane in which the magnetic sensor is disposed is a plane perpendicular to the optical axis of the shooting optical system, and
the magnetic sensor and the coil are configured to sandwich a virtual straight line perpendicular to the optical axis of the shooting optical system in the plane.

6. The lens barrel according to claim 1, wherein
the coil is constructed as a plurality of coils,
the second actuator comprises:
a shutter actuator including one of the coils to drive a shutter; and
an aperture actuator including another one of the coils to drive an aperture, and
a distance between the shutter actuator and the magnetic sensor is greater than
a distance between the aperture actuator and the magnetic sensor.

7. A camera provided with the lens barrel according to claim 1.

8. The lens barrel according to claim 1, wherein
the movable optical member is configured to be moveable vertically relative to the optical axis of the shooting optical system, and
the direction in which the sensitivity of magnetic detection of the magnetic sensor is the highest is parallel to the optical axis of the shooting optical system.

9. The lens barrel according to claim 1, wherein the second actuator comprises a yoke configured to penetrate through the coil, the yoke including:
a penetrating section configured to penetrate the winding center line of the winding wire of the coil;
a first projecting section projecting to a first end side of the coil from the penetrating section; and
a second projecting section projecting to a second end side of the coil on a side opposed to the first end side from the penetrating section, and being formed by folding back toward the first end side up to a position opposed to the first projecting section, wherein
the penetrating section in which the coil is penetrated is disposed more outwardly relative to the movable optical member than a portion of the second projecting section that is folded back.

* * * * *